H. A. HOUSE, Jr.
WIRE WHEEL TRUING STAND.
APPLICATION FILED OCT. 31, 1916.

1,357,056.

Patented Oct. 26, 1920.
4 SHEETS—SHEET 1.

INVENTOR
Henry A. House Jr.
by his attorney
J. Edward Thebaud

H. A. HOUSE, Jr.
WIRE WHEEL TRUING STAND.
APPLICATION FILED OCT. 31, 1916.

1,357,056.

Patented Oct. 26, 1920.
4 SHEETS—SHEET 2.

INVENTOR
Henry A. House, Jr.
by his attorney
J. Edward Thebaud

H. A. HOUSE, Jr.
WIRE WHEEL TRUING STAND.
APPLICATION FILED OCT. 31, 1916.
1,357,056.
Patented Oct. 26, 1920.
4 SHEETS—SHEET 3.
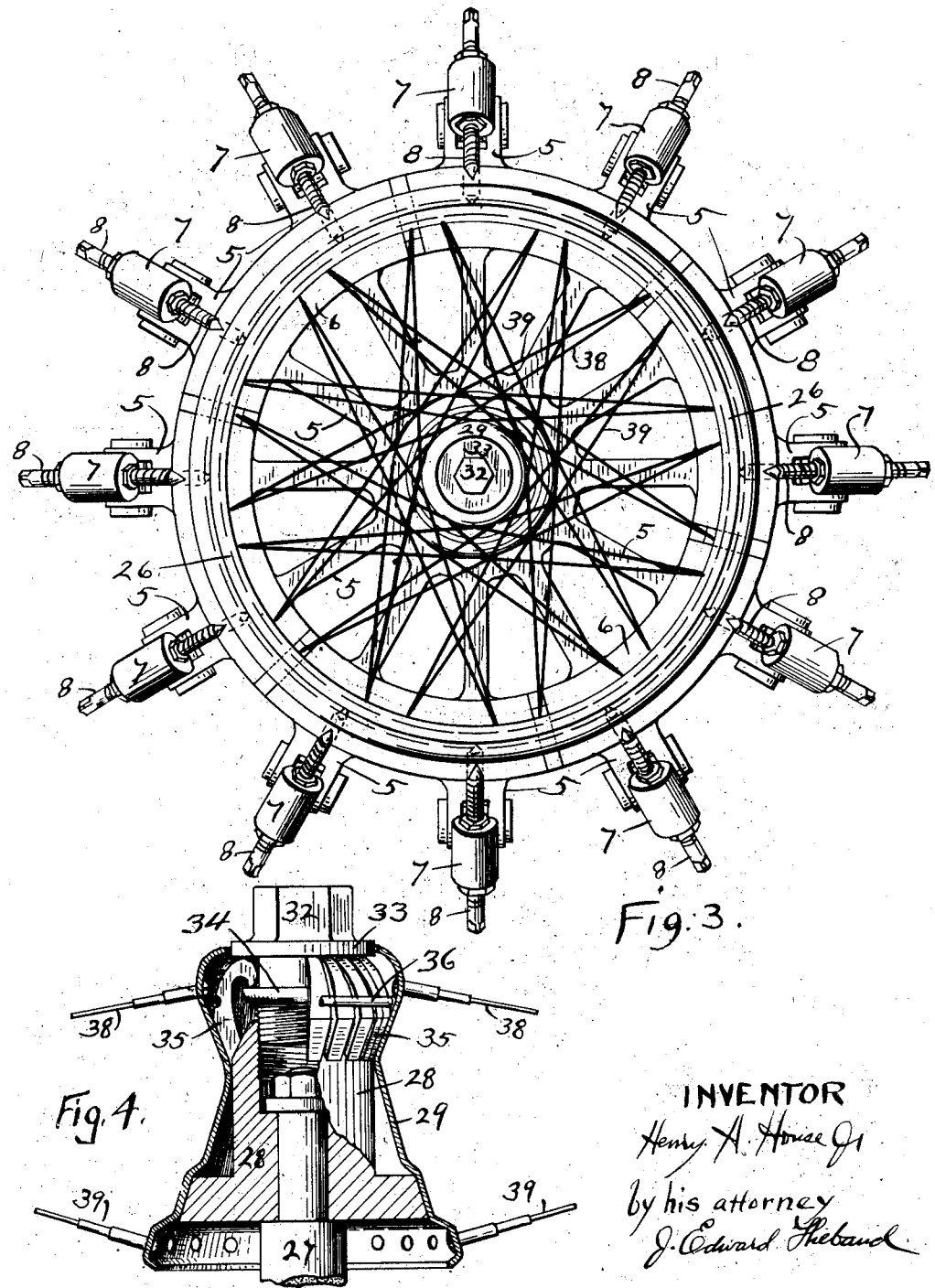

H. A. HOUSE, Jr.
WIRE WHEEL TRUING STAND.
APPLICATION FILED OCT. 31, 1916.

1,357,056.

Patented Oct. 26, 1920.
4 SHEETS—SHEET 4.

INVENTOR
Henry A. House Jr.
by his attorney
J. Edward Thebaud

UNITED STATES PATENT OFFICE.

HENRY A. HOUSE, JR., OF BUFFALO, NEW YORK, ASSIGNOR TO WIRE WHEEL CORPORATION OF AMERICA, OF NEW YORK, N. Y., A CORPORATION OF NEW YORK.

WIRE-WHEEL-TRUING STAND.

1,357,056.　　　　　Specification of Letters Patent.　　Patented Oct. 26, 1920.

Application filed October 31, 1916. Serial No. 128,802.

*To all whom it may concern:*

Be it known that I, HENRY A. HOUSE, Jr., a citizen of the United States, residing at Buffalo, in the county of Erie and State of New York, have invented certain new and useful Improvements in Wire-Wheel-Truing Stands; and I do hereby declare the following to be a full, clear, and exact description of the said invention, such as will enable others skilled in the art to which it appertains to make and use the same, reference being had to the accompanying drawings, and to figures of reference marked thereon, which form part of this specification.

Like figures of reference refer to like parts.

This invention relates to wire wheel truing stands used in shaping up and truing assembled wheels.

One object of this invention is to provide means for truing the rim of a wheel to as near a circular form as is possible, and to hold the rim in this circular form, concentric to the hub, while tensioning the spokes.

Another object is to have the stand adapted to hold the hub in any desired position relative to the plane of the rim.

Another object is to have the stand adapted to forcibly change the hub position relative to the plane of the hub, in connection with tensioning the spokes.

Another object is to provide manually operable means for exerting a forceful movement of the parts of the stand and to retain the forced positioning of the parts in action.

Another object is to provide adjustments to the parts to make the stand readily adaptable to the various sizes and shapes of wire wheels.

Another object is to provide supporting means for the rim on the stand to free the chime of the rim.

To these and other ends my invention consists in means for carrying out these ends, one embodiment of said invention being hereinafter described and illustrated in the drawings. The operation is explained and what I claim is set forth.

In the drawings,

Fig. 3, is a top plan of said stand showing the plurality of centering devices, and a wire wheel in position for operation thereupon.

Fig. 4, is an enlarged sectional elevation of the hub and hub support shown in Fig. 1.

Figure 1:
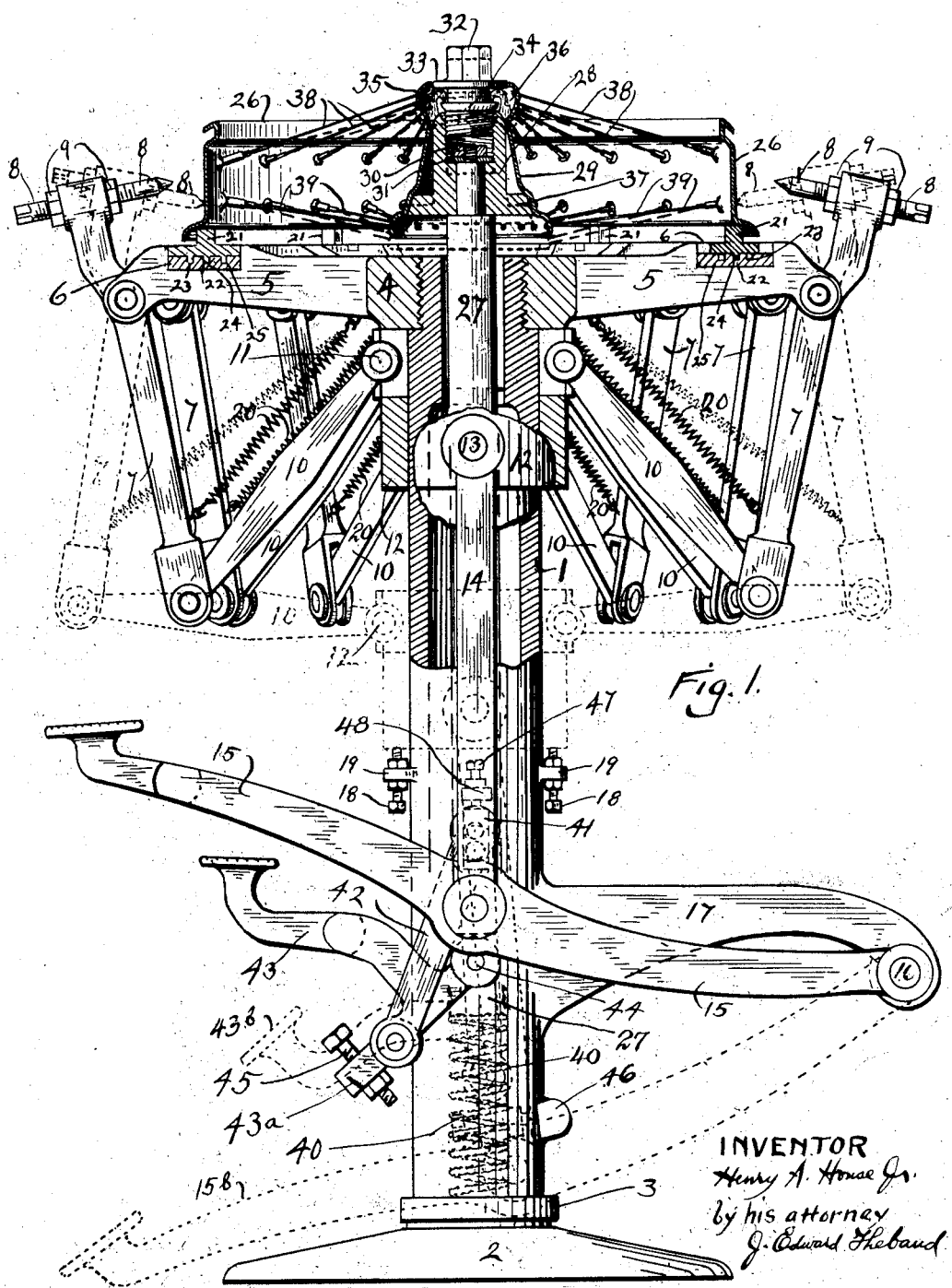
Figure 1, is an elevation, partly in section of a truing stand embodying my invention, showing a wheel supported thereon.
Figure 2:
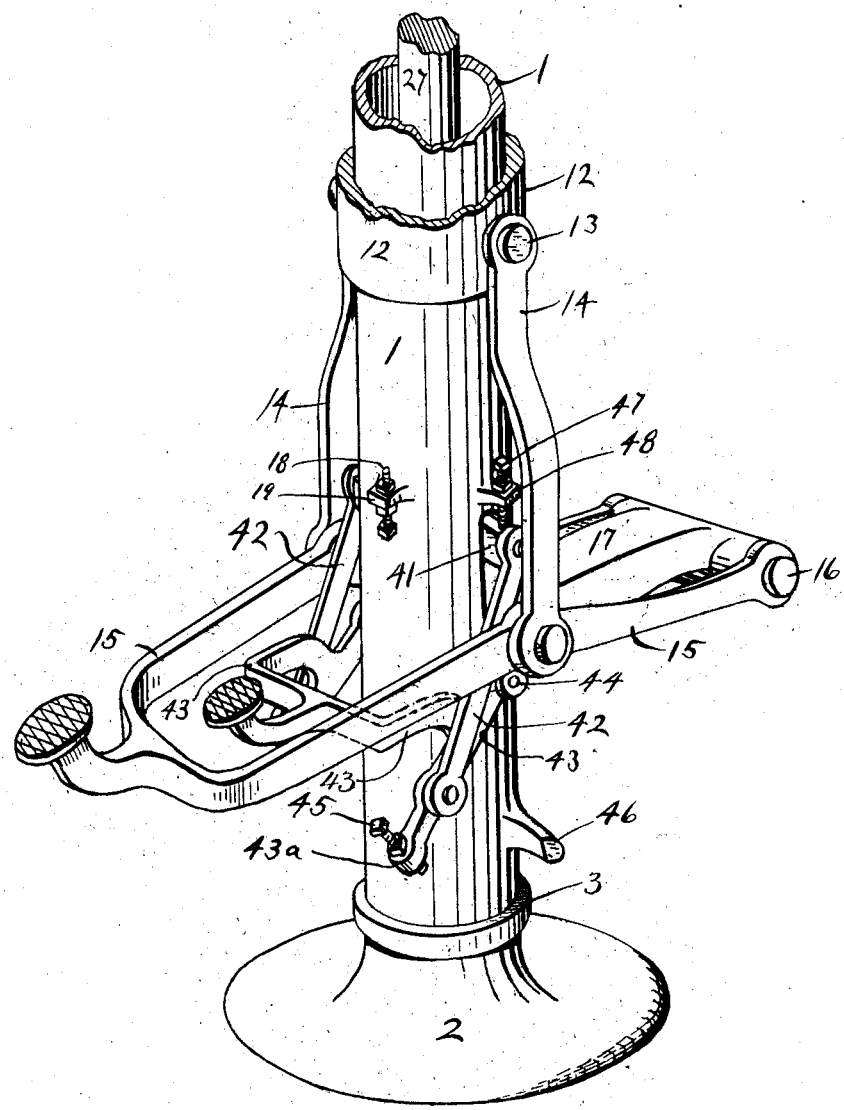
Fig. 2, is a perspective view of the said stand, omitting the top, and showing the foot levers for operating the centering devices, and the central hub support.

The column 1 is rotatably mounted upon the base 2, by means of the ball-bearing 3, and to the upper part of the column 1 is screwed the top 4, having radial arms 5, 5, 5, connected by the ring 6. Journaled in the outer end of each arm 5, and fulcrumed thereto, is the lever 7, to the upper end of which is transversely threaded the pin 8, secured by the lock nuts 9. Pivoted at the lower end of each lever 7, is a link 10, each of which is journaled at 11, to a sleeve 12, which is in sliding engagement with the column 1. Also pivoted to the sleeve 12, at 13, are two links 14, on opposite sides of the column 1. To the lower end of each of the links 14, is pivoted a foot lever 15, which is fulcrumed on the pin 16, in the outer end of the arm 17, the arm 17 being integral with the column 1. Stop-screws 18, 18, passing through lugs 19, 19 integral with the column 1, serve to limit the downward passage of the sleeve 12.

The dotted position of the parts, 7, 8, 10, 12, 20 and 15, is that taken when the foot lever 15 has been pressed down far enough for the sleeve 12 to strike the stop-screws 18 and as shown is a position wherein the links 10 are inclined slightly downward toward the axis of the sleeve 12. The outer pivot centers of the links 10, being above a horizontal plane passing through the inner pivot centers of these links 10, a slightly downward force is exerted upon the sleeve 12, by the springs 20, so that the sleeve 12 is held against the stop-screws 18 by a force independent of the weight of the parts. The springs 20 which connect each lever 7, to the inner end of its corresponding arm 5, normally act to hold the sleeve 12 in its uppermost position, and the pins 8 in their outmost position. On the ring 6 are a plurality of individual supports 21, 21, for the rim 26 of the wheel to be trued. In order to accommodate rims of different diameters the supports 21 can be radially adjusted relative to the distance from the axis of the column 1, according as the pin 22 projecting from the bottom of each support is positioned in the circular rows of holes 23, 24 and 25. It will be understood, of course, that all the supports must be positioned in the same row of holes. Passing up through the center of the column 1, is a post 27, at the upper end of which is mounted a hub support 28, adapted to concentrically position a hub shell 29 with respect to the axis of the post 27 and the rim 26. The hub support 28 is held onto the upper end of the post 27, by means of the nut 30, and the washer 31. In threaded engagement with the hub support 28 is shown the nut 32, having a flange 33, and a smaller flange 34. Engaging the smaller flange 34, are segments 35 of a split-ring, inwardly pressed by a spiral spring 36. The inner ends of the segments 35 engage the upper conical end of the hub support 28, and the interior conical surface of the hub-shell 29, thus centering the hub shell 29 at its upper end upon the hub support 28. Fig. 4 shows these parts on an enlarged scale. The hub shell, support and holding nut device are similar to those shown in my co-pending application, filed February 10, 1916, bearing the Serial Number 77,441. The lower part of the hub shell 29 is centered by the flange 37, of the hub support 28. Connecting the rim 26 with the upper part of the hub shell 29, is the set of spokes 38, upwardly inclined toward the hub shell 29. The lower part of the hub shell 29, is connected with the rim 26, by the set of spokes 39, which are downwardly inclined toward the axis of the hub shell 29. The post 27, is supported upon a spring 40, in the bottom end of the column 1. Passing transversely through the post 27, and slots 41′ in the column 1, is a cross-beam 41, to the outer ends of which are pivoted links 42. To the lower ends of the links 42, is pivoted the foot lever 43, which is fulcrumed at 44 on the column 1. A stop-pin 45 is adjustably positioned in an arm 43^A projecting from and integral with the lever 43 to engage a stop 46 upon the column 1. The upward movement of the post 27, is limited by the engagement of the cross-beam 41 with the stop-pins 47, on the lugs 48, being integral with the column 1. The dotted position of the hub-shell 29, spokes 38, 39, foot lever 43, and links 42, is that taken by these parts, when the foot lever 43 is forced downward to bring the stop-pins 45 against the stops 46.

Figure 5:
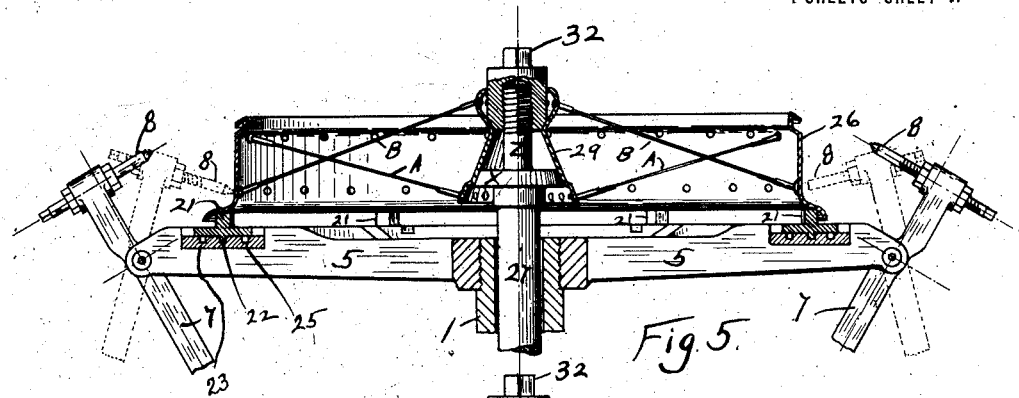
Fig. 5, shows a wheel of the double-crossed spoke lacing type positioned upon the head of the stand.
Figure 6:
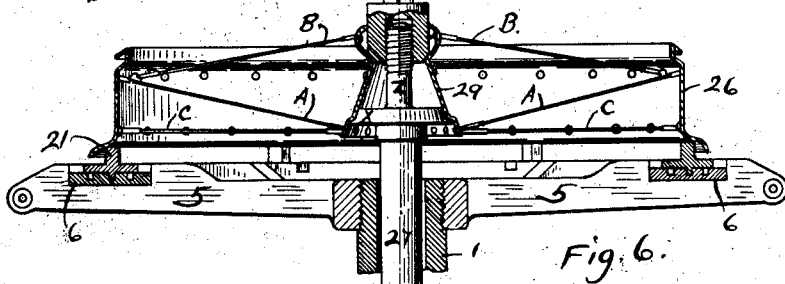
Fig. 6, shows a wheel of the triple crossed spoke lacing type positioned upon the head of the stand.
Figure 7:
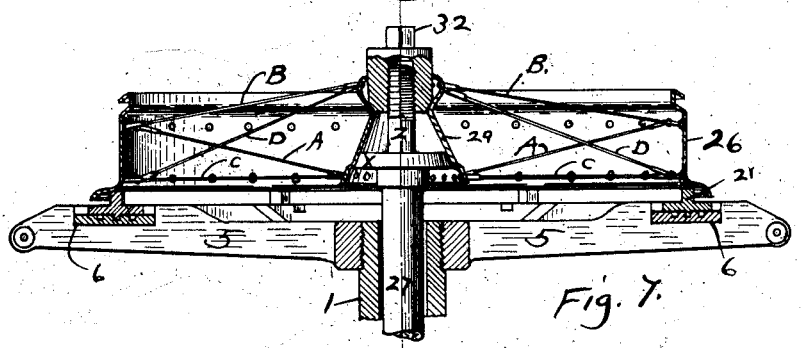
Fig. 7, shows a wheel of the quadruple crossed spoke lacing type positioned upon the head of the stand.
Figure 8:
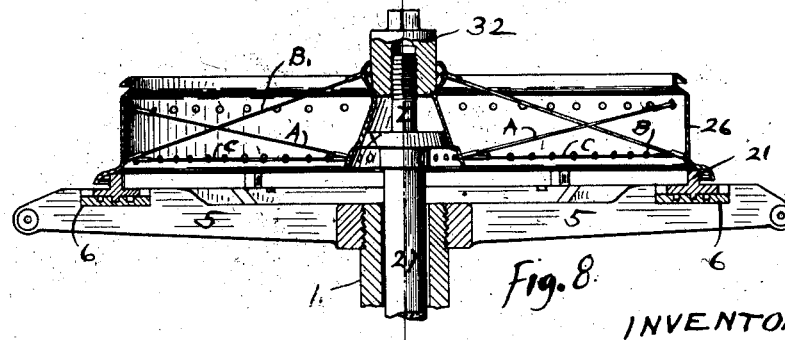
Fig. 8, shows a wheel of the triple crossed spoke lacing type positioned upon the head of the stand.

The truing stand is adapted to operate on wire wheels having a variety of spoke lacings, examples of which are shown in the drawings and will now be described. Fig. 1 shows a wire wheel of the double spoke type, i. e., one in which the spokes are arranged in two sets 38 and 39 the set 38 extending from the outer end of the hub shell to the outer edge of the rim and the set 39 from the inner end of the hub shell to the inner edge of the rim. Fig. 5 also shows a wheel of the double spoke type but in this wheel the set A extends from the inner end of the hub shell to the outer edge of the rim and the set B from the outer end of the hub shell to the inner edge of the rim. Figs. 6 and 8 show wheels having two types of triple spoke lacing which differ merely in the arrangement of the set B, that set in Fig. 6, extending from the outer end of the hub shell to the outer edge of the rim and in Fig. 8 from the outer end of the hub shell to the inner edge of the rim. In both these wheels the set A extends from the inner end of the hub shell to the outer edge of the rim and the set C extends from the inner end of the hub shell to the inner edge of the rim. Fig. 7 shows a wheel having the quadruple spoke lacing the sets A and B from the outer end of the hub shell to the inner and outer edges respectively of the rim and the sets C and D extending from the inner and outer edges respectively of the rim. The lacings shown in Figs. 5, 7 and 8 are referred to as of crossed spoke type.

The operation of the truing stand will now be described.

A loosely assembled wheel is positioned on top thereof, having the hub shell 29, resting upon the hub support 28. The nut 32 is screwed down until the ring segments 35 are caused to move outward, and downward, and engage the inner conical upper end of the hub shell 29, fixing the said hub shell upon its support 28. The post 27 is forced upward by the spring 40, causing the cross-beam 41 to engage the stop-pins 47, limiting the upward position of the post 27, and hub support 28; this position is adjustable to any fixed point by adjusting the pins 47 on the lugs 48. The rim 26, is allowed to rest upon the plurality of supports 21, which have been previously adjusted radially to catch the shoulder of the rim 26, and relieve the chime 26^A of supporting contact with any part of the top. The foot lever 15, is next forcibly pressed downward pulling down the sleeve 12, and causing the pins 8, to press inward and downward against the rim 26, securing the same in position, concentric to the axes of the post 27, while at the same time, causing it to assume a circular form. While in this position, the levers 7 are automatically locked by the position of the links 10, as explained above. The sleeve 12 is limited in its downward position by the adjustable stop pins 18, passing through the lugs 19, the downward position of the foot lever 15 being marked 15ª.

The spokes 39 are next tensioned, preferably equally, and thereafter the foot lever 43 is pushed down into the dotted position 43ᵇ shown, causing the link 42 to be so positioned as to have its axes pass beyond the pivot center 44, thereby locking the post 27 in a downward position against the strained tension of the spokes 39; the downward position of the foot lever 43 is adjustably fixed by the stop screw 45, which engages the stop 46. The spokes 38 are next equally tensioned and thereafter the foot lever 43 is released, allowing the spokes 39 to partially relax, at the same time increasing the strain upon the spokes 38, permitting the hub shell 29 to assume a certain position relative to the plane of the rim 26. The foot lever 15 is next released and the nut 32 is unscrewed sufficiently to permit the ring segments 35 to collapse inward for freeing the hub shell 29 from the hub support 28, when taking the finished wheel off from the stand and making place for another one.

This description of the operation refers to the double spoke laced wheel shown in Fig. 1, but the stand is adapted for the truing and tensioning wheels, having different kinds of spoke lacing, wherein one set is inclined inward toward the inside of the wheel, or is located in a radial plane perpendicular to the axis, and one or more other sets completes the wheel. The spokes connected to the inner end of the hub (such as those connected with the hub 29, marked 39) are either horizontal or inclined downward toward the axis of the wheel, when the wheel is placed in the position shown in the figures. The stand can be turned to any desired position in front of the operator by revolving it on its ball-bearing 3.

Having described my invention in connection with one embodiment only, what I claim and desire to cover is as follows:

1. In a truing stand, a base, a standard, a top on said standard, means for centering a hub on said top, means acting independently of said top for centering and holding a rim concentric with said hub, and means for moving the hub in the direction of its axis to strain one or more sets of spokes, between the said hub and the said rim, held in a fixed position.

2. In a truing stand, a base, a standard rotatably mounted upon said base, a top on said standard, means for centering a hub on said top, means acting independently of said top for centering and holding a rim concentric with said hub, and means for moving the hub in the direction of its axis to strain one or more sets of spokes, between the said hub and the said rim, held in fixed position.

3. In a truing stand, a ring on which a rim may rest, a support for a hub concentric with the rim, and means acting independently of said ring for engaging the outer edge of the rim to press it into circular form around the hub and means for moving the hub and its support axially to increase the tension of certain of the spokes.

4. In a truing stand, a base, a standard, a top on said standard, means for centering a hub on said top, means for centering and holding a rim on said top concentric with said hub, during the centered position of said hub on said top, and means for pressing said rim inwardly into circular form while centered with respect to said hub on said top, said last named means including a plurality of inwardly movable members.

5. In a truing stand, a base, a standard, a top on said standard, a centrally located vertical post adapted for reciprocation within said standard, a support on said post adapted to receive a hub in the vicinity of said top, means for reciprocating said post along the line of its axis, means for limiting the movement of said post in either direction, and means for centrally locating a rim on said top with respect to a hub held on said support.

6. In a truing stand, a base, a standard, a top on said base, means for centering and holding a hub on said top concentric with said hub, during the centered position of said hub on said top, means for pressing said rim inwardly into circular form while centering said rim with respect to said hub on said top, said last mentioned means comprising a plurality of devices adapted to contact said rim and to be adjustably positioned with respect to causing the circular form thereof, and toggle-joint means adapted by a vertical movement to radially force said rim into circular form.

Buffalo, N. Y., October 30, 1916.

HENRY A. HOUSE, Jr.

Witnesses:
N. L. Cook,
A. Steidle.